Jan. 10, 1967 R. F. BEMB 3,297,286
STRAIN RELIEVING CLAMP
Filed March 30, 1965 2 Sheets-Sheet 1

INVENTOR.
Richard F. Bemb,
BY
Parker Brosnan,
ATTORNEYS.

INVENTOR.
Richard F. Bemb
BY
Parker & Brochman,
ATTORNEYS.

1

3,297,286
STRAIN RELIEVING CLAMP
Richard F. Bemb, Tonawanda, N.Y., assignor to
Reliever, Inc., Buffalo, N.Y.
Filed Mar. 30, 1965, Ser. No. 443,983
11 Claims. (Cl. 248—74)

This invention relates to devices or clamps for relieving strains on individual wires emanating from a group of wires so that strains on the group of wires will not be transmitted to the individual wires and their connections with the parts of an instrument.

In many instruments or electrical devices a considerable number of wires may be needed to conduct electric energy to various parts of the instrument and sometimes these wires are quite small and their connection with parts of the instrument are consequently also not very strong so that an individual wire can be readily torn or disconnected from its connection with a part of the instrument by strains on the group of wires.

One of the objects of this invention is to provide a construction in which strains on a group of wires will not be transmitted to the individual wires separated from the group or their connections with parts of an instrument.

Another object is to provide a strain reliever or clamp which may be secured to a housing or chassis of an instrument or electrical apparatus to which the individual wires are connected.

A further object is to provide a strain reliever in which the individual wires of a group are clamped to the reliever and secured to a chassis or housing in such a manner that any strain or pull on the group of wires will be transmitted to the chassis or housing and not to the individual wires.

It is also an object to provide a relief device or clamp which may be secured to an instrument case in such manner that individual wires may extend into the case through airtight connections.

A still further object is to provide a relief device in which the various wires of a group are clamped to the device in such a manner that any strains to which the group of wires is subjected are not transmitted to any of the individual wires.

Figure 1:
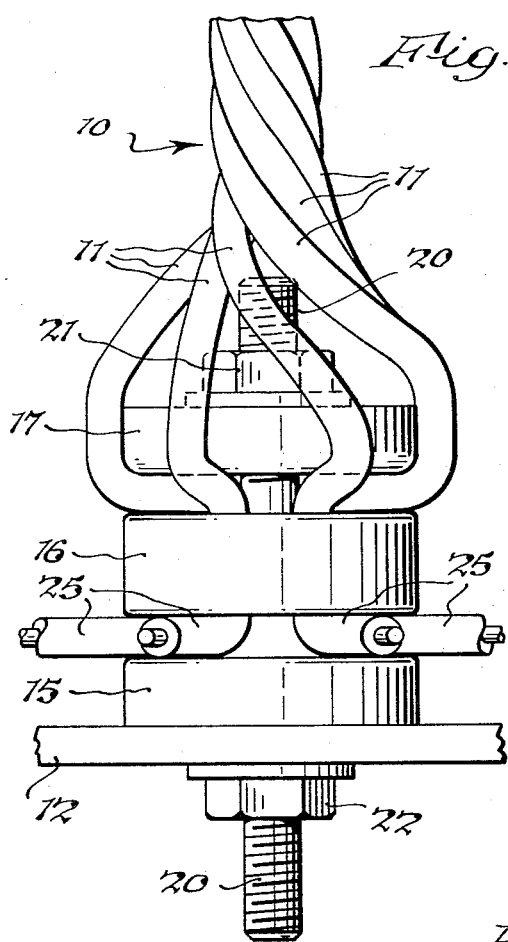
FIG. 1 is a side elevation of a strain reliever embodying this invention.
Figure 3:
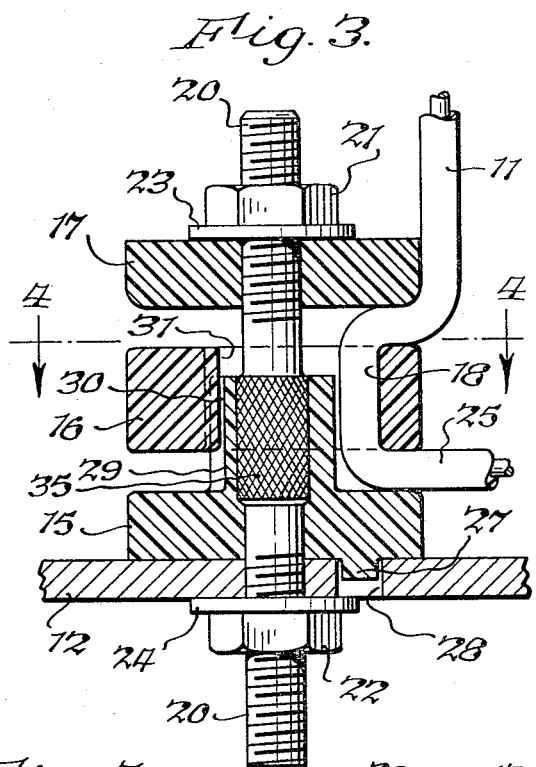
FIG. 3 is a central, sectional elevation thereof.
Figure 2:
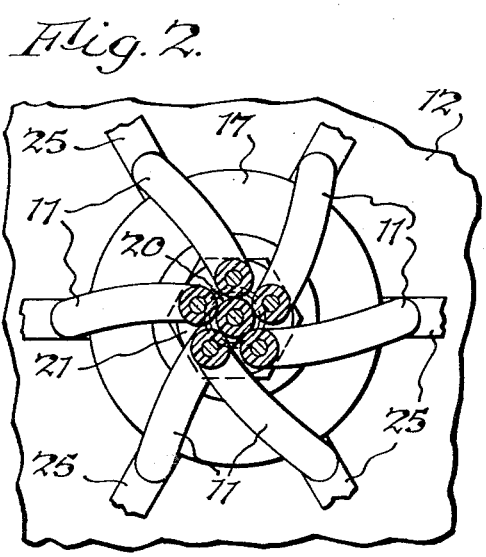
FIG. 2 is a top plan view thereof.
Figure 4:
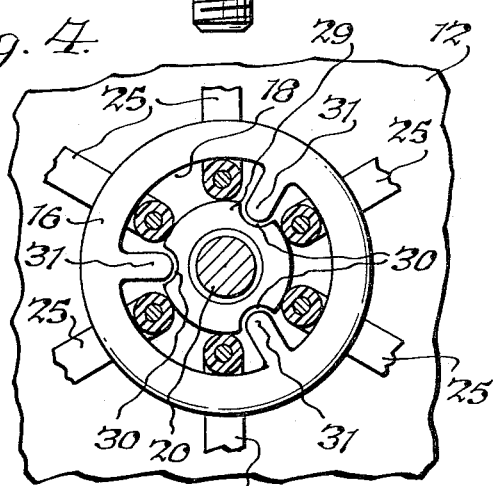
FIG. 4 is a transverse sectional view thereof on line 4—4, FIG. 3.

In many types of instruments and electrical structures in which a number of electrical conductors are required for connection with various parts of the instrument, it is desirable to provide means for eliminating the individual strains or tensions which may be applied to the individual wires to prevent them from becoming detached from the parts of the instrument with which they are connected.

10 represents a group of wires consisting of individual wires 11 which are connected to different parts of an instrument contained in a housing or chassis and which has terminals of various types to which the individual wires are to be connected. 12 represents a part of a housing or chassis containing the instrument.

My improved relief device includes a base member 15 which is preferably of disk shape, a ring 16 also of disk shape having a plurality of apertures therein through which the wires 11 may pass, and a pressure pad 17. The base member and the pressure pad constitute clamping members between which the wires 11 are clamped.

The individual wires 11 are inserted radially between the pressure pad and the ring and each wire is then extended through an opening 18 of the ring, and then outwardly into the space between the ring and the base member. It will be noted that when the pressure pad is pressed toward the base member, the parts of the wires arranged between the pad and the base member will be pinched or clamped between the pressure pad, the ring and the base member so that strains or tensions on the group of wires 10 will not be transmitted to the parts 25 of the individual wires arranged beyond the relief device. The ring 16 serves not only to hold the wires 11 in position to receive pressure, but also to hold the wires from being pulled out of place from between the pad and the base.

Pressure may be applied in any suitable manner to urge the presure pad and base member toward each other, and in the construction shown for this purpose a stud or bolt 20 is provided which extends through holes in the members 15, 16 and 17 and is threaded at opposite ends and provided with nuts 21 and 22 and washers 23 and 24. In order to relieve strains on individual wires 11 after they have passed through the space between the ring and base member, the relief device is secured to the chassis member 12, this being done in the construction shown by providing a hole in the chassis member through which the bolt or stud passes. Consequently when the nuts 21 or 22 are turned to move toward each other on the threaded parts of the stud or bolt, the desired pressure will be applied to the parts of the relief device and they will also be secured to the chassis or container 12. Thus when any pressure or strain is applied to the group of wires 10, such strain or tension will be transmitted through the relief device directly to the container, and the parts 25 of the wires extending out of their relief device between the base member 15 and ring 16 will be free from any strains or forces to which the wire group 10 may be subjected. Consequently the parts 25 of the strument wires may be suitably connected to the instrument as may be desired, and any strains or stresses to which the group of wires is subjected will be passed through the bolt or stud 20 directly to the chassis 12.

It is desirable to prevent the relief device from turning relatively to the instrument to which the wire parts 25 are connected and for this purpose I preferably provide the base member 15 with a downwardly extending projection 27 which extends through a hole 28 in the chassis 12. It is also desirable to prevent the ring 16 from rotating relatively to the base member and this may be accomplished in any suitable manner, for example, by providing the base member with an upwardly extending sleeve or tubular part 29 having rigidly extending recesses or keyways 30 at intervals on its periphery and providing the ring with inwardly extending fingers or projections 31 formed to extend into the keyways or recesses 30. In this manner the ring is prevented from turning relatively to the base member and therefore is indirectly also prevented from turning relatively to the chassis 12.

It is also desirable to provide the stud of bolt 20 with some means for preventing rotation of the same relatively to the ring and base member and for this purpose the bolt or stud may be provided intermediate of its ends with a knurled or roughened surface 35. The stud or bolt in the assembly of the relief device is pressed into the tubular part or sleeve 29 and thus forms a connection between the ring and the stud which prevents turning of one relatively to the other and thus prevents turning of the stud relatively to the chassis. Consequently, when the nuts 21 and 22 are tightened on the bolt or stud 20, the various parts of the relieving device are held against turning relatively to each other. The pressure pad 17 is of course held frictionally against the wires 11 so that it will not tend to turn relatively to the other parts of the relieving device.

Under certain circumstances it may be desirable to have the wires extend through to the interior of the chassis of the instrument so as to avoid the entry of moisture into the housing or chassis of the instrument.

Figure 5:
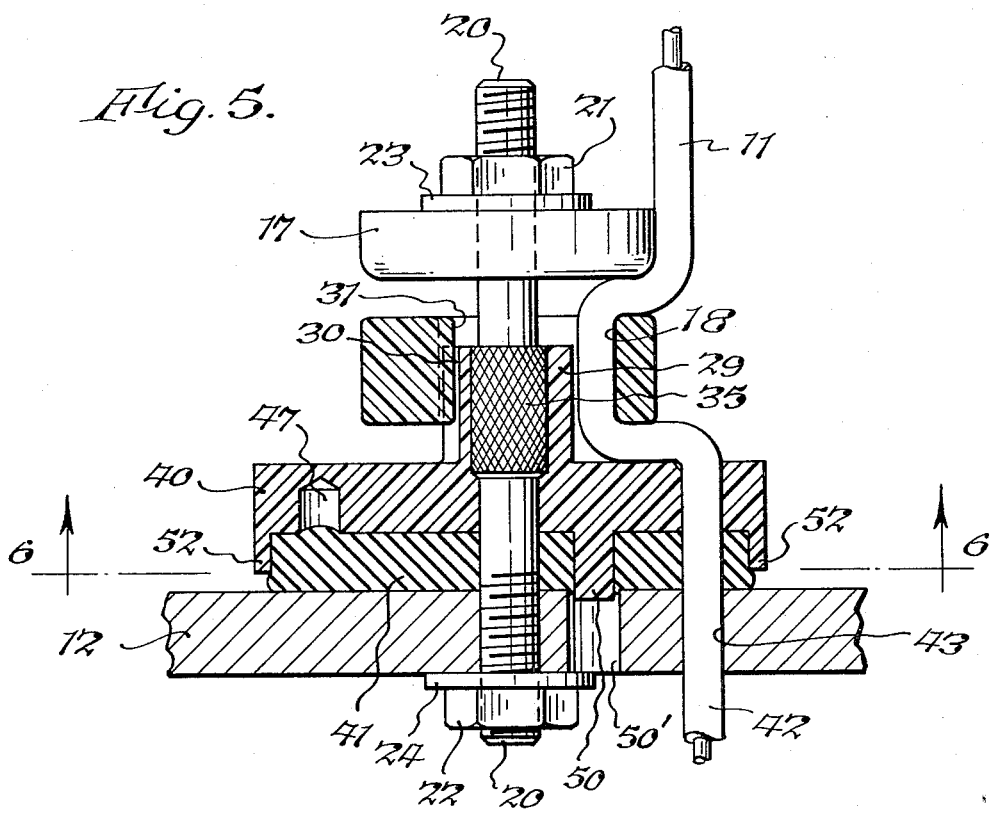
FIG. 5 is a sectional elevation of a strain reliever of a modified construction.
Figure 6:
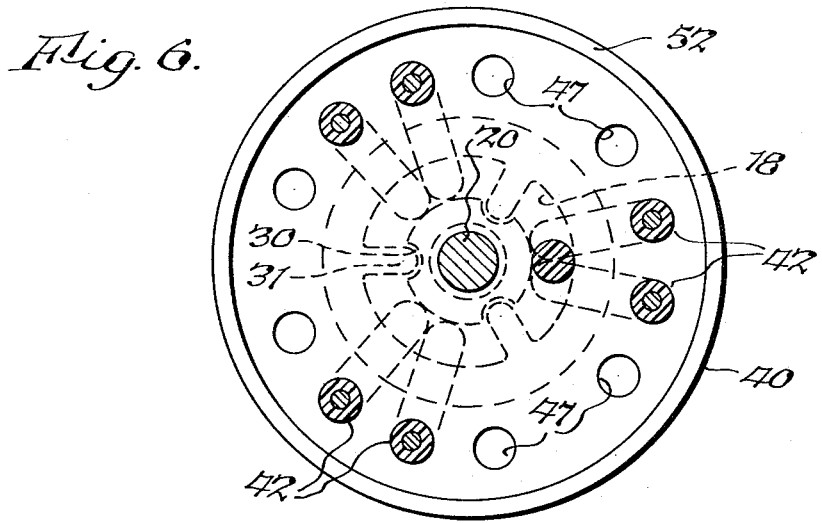
FIG. 6 is a sectional view thereof on line 6—6, FIG. 5.

In FIGS. 5 and 6 I have shown a modified construction of my improved relief device in which entrance of moisture or outside air is prevented. In this construction a base member 40 is provided which cooperates with a rubber or compressible disk or gasket 41 positioned between the chassis 12 and the base member; also the individual wires 42 pass through holes 43 in the base member and holes in the gasket member 41 and the chassis 12 so that these parts 42 of the wires may pass downwardly into the interior of the housing without permitting a gas or moisture from passing into or out of the interior of the housing.

The other parts of the relieving device shown in FIGS. 5 and 6 are the same as those described in connection with FIGS. 1–4 and similar reference characters are employed for these parts. It will consequently be obvious that when pressure is applied to the relief device by the nuts on the stud or bolt 20, the rubber or flexible washer 41 will be compressed so as to tightly grip the parts 42 of the wires and prevent moisture or outside air from passing through the holes in the gasket member.

The relief device described may be used in connection with one or more wires and may also be formed in such a manner that only the desired number of holes are originally drilled in the base member 40. Other spaces in the base member which may be supplied with holes are molded partly through the same as indicated at 47 so that they can be easily drilled through if needed. However, with the use of a gasket 41 all of the holes of the base member may be initially drilled through since the gasket will close up those holes which are not used.

My improved device may be made in any sizes depending upon the sizes of the wires with which the relief devices are used. It will also be noted that in the construction shown in FIGS. 5 and 6 any pulls or strains exerted on the group of wires leading to the relief device will be taken up through the bolt or stud and will not affect the efficiency of the gasket 41, which will receive none of these strains and will continue to form a tight seal.

In order to prevent movement of the base 40 relatively to the chassis 12 the projection or post 50 formed on the base member will pass through a hole in the gasket and into a corresponding hole 50' in the base member 12. Also the base member 40 is preferably provided at its periphery with a downwardly extending flange 52 for the purpose of confining the gasket 41 in correct relation to the base member, and this flange will confine the gasket so that the pressure exerted on the gasket will tend to force the gasket more securely against the wires 42, the stud 20 and the post 50, thus making sure that no leaks will occur.

The parts of the relief device with the exception of the stud 20 are preferably made of suitable insulating material such as a molded plastic.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A strain relief device for preventing the transmission of strains to which a group of wires is subjected to individual wires separated from the group, said device comprising, a housing to which wires are connected and including a pair of clamping members between which individual wires are adapted to extend, means for confining individual wires between said clamping members, means for urging said clamping members toward each other to secure individual wires in fixed relation to said device, and means for securing said device to said housing.

2. A strain relief device for preventing the transmission of strains to which a group of wires is subjected to individual wires separated from the group, said device comprising, a housing to which wires are connected and including a pair of clamping members between which individual wires extend, means for confining individual wires between said clamping members, and a clamping stud extending through holes in said clamping members for urging said members toward each other to clamp individual wires to said device.

3. A strain relief device for preventing the transmission of strains to which a group of wires is subjected to individual wires separated from the group, said device comprising, a housing to which wires are connected and including clamping means for securing individual wires of the group thereto, and means for rigidly securing said clamping means to said housing.

4. A strain relief device according to claim 3 in which said clamping means is a stud which extends through said housing and through said clamping means, and which applies clamping pressure to said clamping means and also secures said device and wires to said housing.

5. A strain relief device for clamping individual wires of a group to prevent the transmission of stresses by the group to individual wires comprising, a chassis to which wires are secured, a ring having a plurality of holes through which individual wires may pass and from which they extend into positions to be connected to contacts, clamping members at opposite faces of said ring, and means for drawing said clamping members to opposite faces of said ring to clamp said wires to opposite faces of said ring.

6. A device according to claim 5 and including means for securing said device to a chassis.

7. A strain relief device for relieving individual wires of a group of wires from stresses at their individual connections, which comprises, a chassis to which said relief device is secured, a base member adjacent to said chassis, means for securing said base member against turning relatively to said chassis, a ring having openings for individual wires, a pressure pad extending over said openings in said ring, and a stud extending through holes in said chassis, base member, said ring and said pressure pad for pressing these parts together to clamp a wire to said relief device.

8. A strain relief device for preventing the transmission of strains to which a group of wires is subjected to individual wires separated from the group, said device comprising, a housing to which wires are connected and including a pair of clamping members between which individual wires are adapted to extend, means for confining said individual wires between said clamping members, means for urging said clamping members beyond each other to secure individual wires in fixed relation to said device, means for securing said device to said housing, individual wires adapted to extend through holes into said housing, and a gasket of resilient material between said base and said housing and forming a gas-tight seal between said device and said housing.

9. A strain relief device according to claim 7 and including a key connection between said base and said ring which prevents turning of said ring relatively to said base but permits lengthwise movement of said ring relatively to said base.

10. A device according to claim 9 and including a non-rotatable connection between said stud and said base member.

11. A device according to claim 7 and including a projection on said base member extending through a hole in said chassis spaced from the axis of said stud to prevent turning of said base member relatively to said stud and said chassis.

No references cited.

CLAUDE A. LE ROY, *Primary Examiner.*